Nov. 17, 1959  J. M. HAIT  2,913,028
FRUIT ORIENTING AND PITTING MECHANISM
Filed Oct. 1, 1949   6 Sheets-Sheet 1
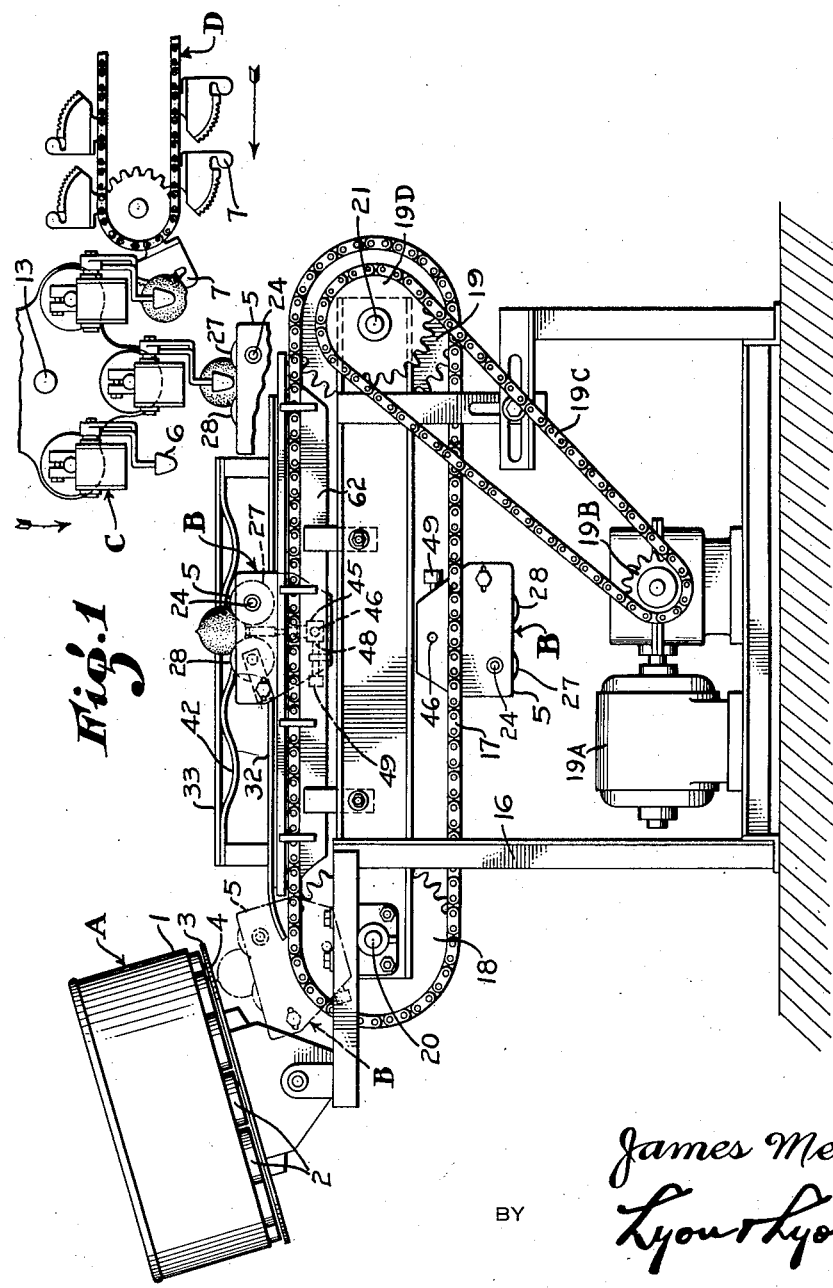
INVENTOR.
James Merritt Hait
BY
Lyon & Lyon
ATTORNEYS.

Nov. 17, 1959   J. M. HAIT   2,913,028
FRUIT ORIENTING AND PITTING MECHANISM
Filed Oct. 1, 1949   6 Sheets-Sheet 2
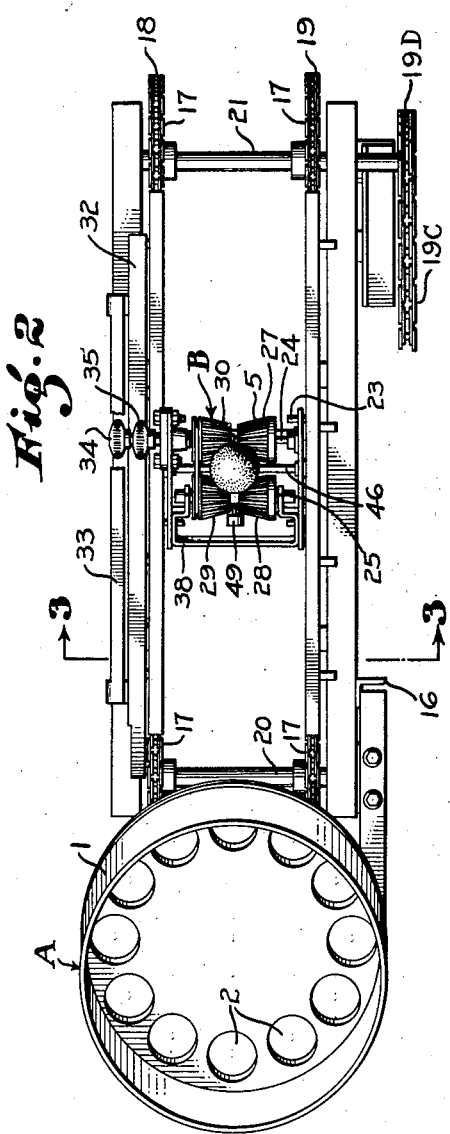
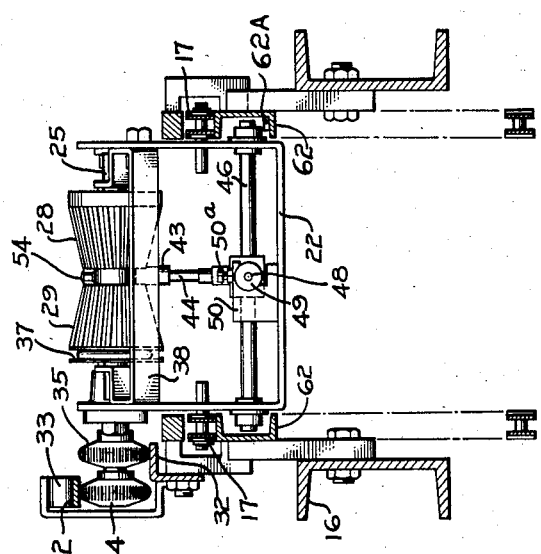
INVENTOR.
James Merritt Hait
BY Lyon & Lyon
ATTORNEYS.

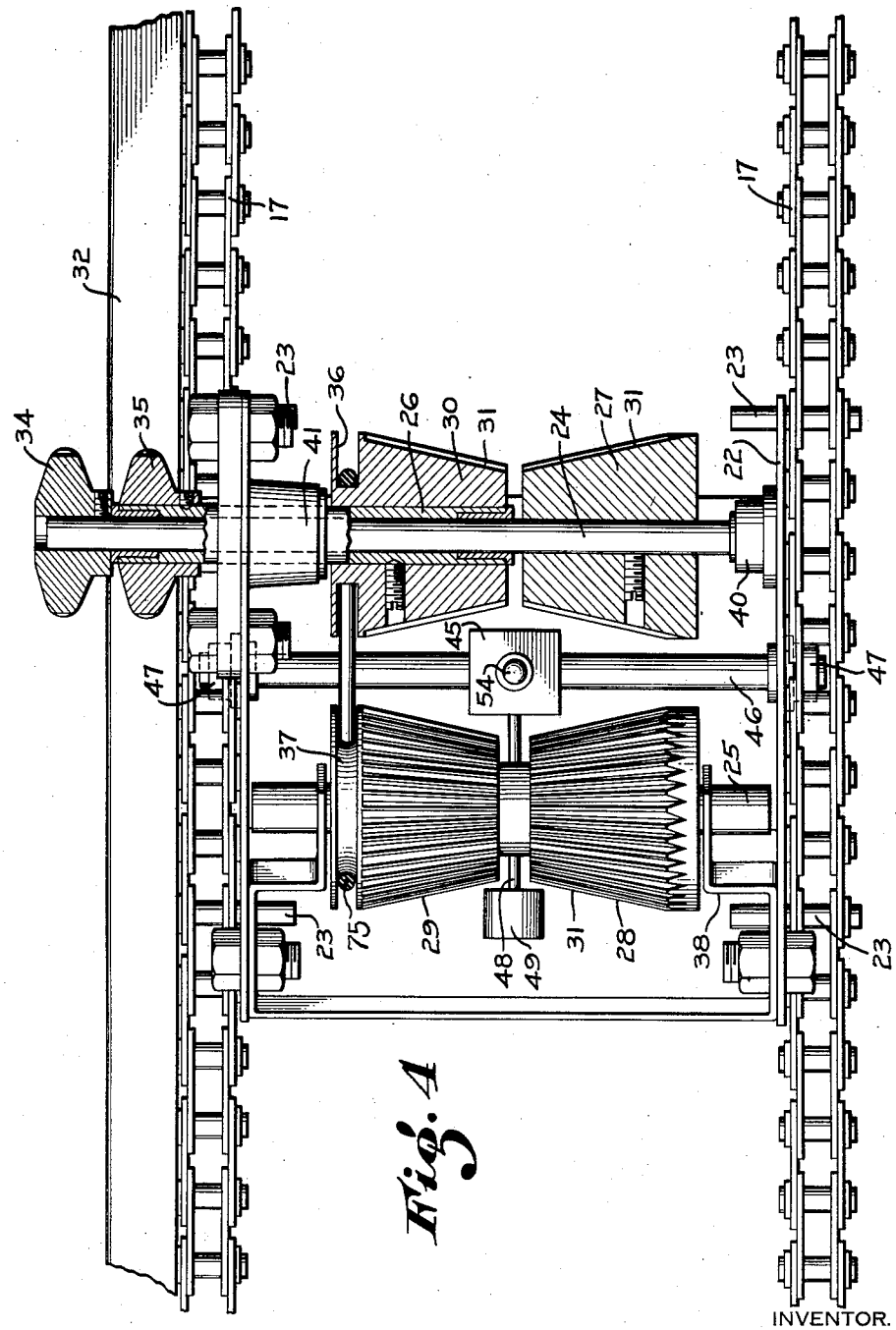

Nov. 17, 1959  J. M. HAIT  2,913,028
FRUIT ORIENTING AND PITTING MECHANISM
Filed Oct. 1, 1949  6 Sheets-Sheet 4

INVENTOR.
James Merritt Hait
BY Lyon & Lyon
ATTORNEYS.

Nov. 17, 1959  J. M. HAIT  2,913,028
FRUIT ORIENTING AND PITTING MECHANISM
Filed Oct. 1, 1949  6 Sheets-Sheet 5
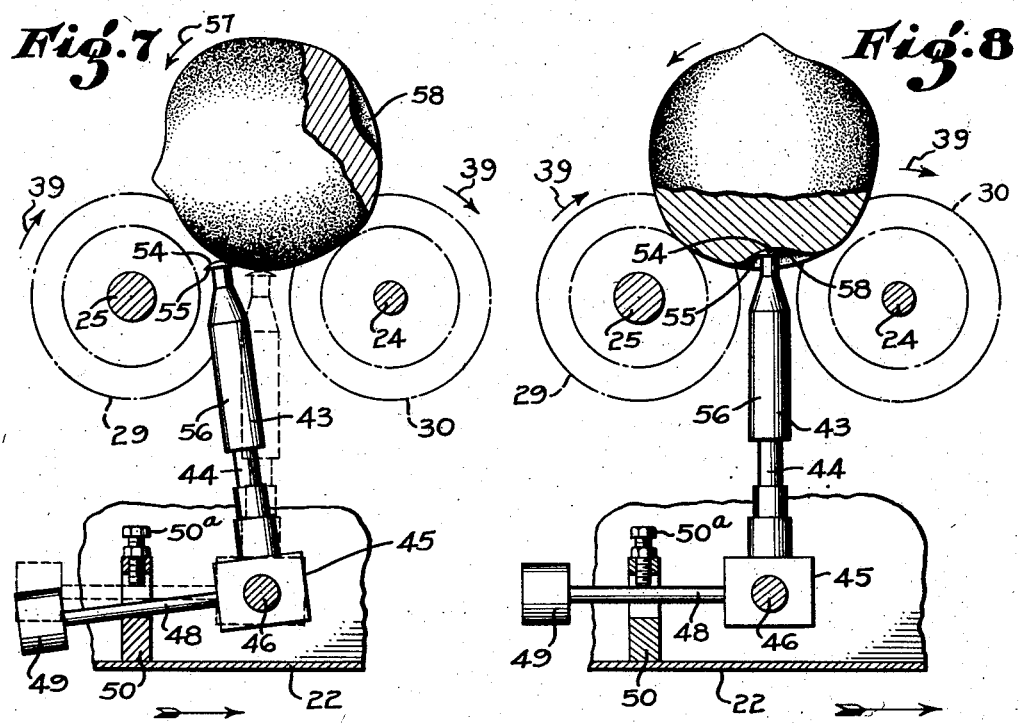
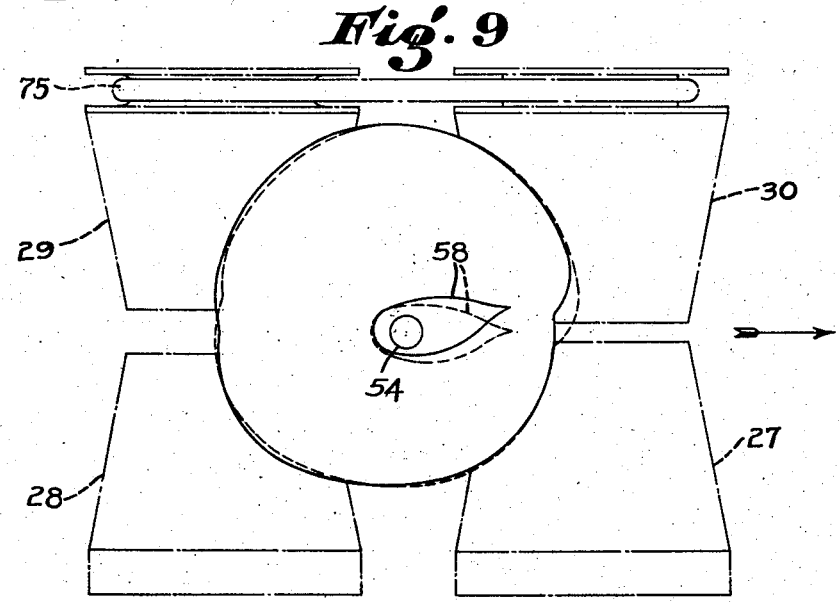
INVENTOR.
James Merritt Hait
BY
Lyon & Lyon
ATTORNEYS.

Nov. 17, 1959  J. M. HAIT  2,913,028
FRUIT ORIENTING AND PITTING MECHANISM
Filed Oct. 1, 1949  6 Sheets-Sheet 6

CONDITION #1  #2  #3

INVENTOR.
James Merritt Hait
BY
Lyon & Lyon
ATTORNEYS.

United States Patent Office 2,913,028
Patented Nov. 17, 1959

2,913,028

FRUIT ORIENTING AND PITTING MECHANISM

James Merritt Hait, San Jose, Calif., assignor, by mesne assignments, to Food Machinery and Chemical Corporation, San Jose, Calif., a corporation of Delaware Application October 1, 1949, Serial No. 119,069

15 Claims. (Cl. 146—28)

This invention relates to fruit orienting mechanism and method of aligning and orienting fruit such as peaches preparatory to the halving and pitting thereof. While this invention is particularly directed to a machine for orienting and aligning clingstone peaches, it is obviously not limited to such specific use but is applicable for use in orienting and aligning any other similar type of fruit where it is necesary to orient the fruit with relation to an end cavity such as the stem end cavity of a peach and where it is likewise desirable to align the peach with reference to its plane of suture, that is, the plane in which the largest section of the fruit pit lies.

In peaches and other similar fruit the stem end cavity is not circular, but in section has a long diameter and a short diameter, the longer diameter lying in the plane of suture of the fruit pit and the shorter diameter usually traversing the longer diameter.

Many attempts have heretofore been made to produce a machine, apparatus or method which was applicable for positioning or orienting and aligning of such fruit preparatory to their entry into a machine or apparatus in which they are processed such, for example, as being halved and pitted preparatory to canning or other uses.

It is an object of this invention to provide a machine, apparatus and method for the handling of fruit of the character above referred to which will efficiently and effectively determine a cavity in a fruit so as to orient the fruit along its stem blossom axis and will at the same time align the fruit in position with reference to its plane of suture.

Another object of this invention is to provide a peach aligner and orienter which will quickly, accurately and independently orient and align a fruit within a predetermined plane.

Another object of this invention is to provide a feed mechanism for receiving, orienting and aligning fruit such as clingstone peaches in such a position that their stem blossom axes are in definite position and the plane of suture is within a definite plane with relation to the processing elements of an apparatus for pitting and halving fruit.

Other objects and advantages of this invention it is believed will be apparent from the following detailed description of a preferred embodiment thereof as illustrated in the accompanying drawings.

In the drawings:

Figure 1 is a side elevation diagrammatic in character of a fruit hopper A, a fruit orienting and aligning machine B, a transfer unit C, and a processing unit D.

Figure 2 is a plan thereof with portions removed.

Figure 3 is an enlarged end sectional view taken substantially on the line 3—3 of Figure 2.

Figure 4 is a detached plan view partially in section on an enlarged scale of the fruit orienting, aligning and conveying means of my invention.

Figure 7 is a diagrammatic view illustrating the operation of the finder and rotating means of my invention in the step of rotating the fruit preliminary to the location of the blossom indent thereof.

Figure 8 is a view similar to Figure 7 illustrating the operation in locating the blossom indent end in which the fruit is held from further rotation.

Figure 9 is a phantom view illustrating the operation of aligning the fruit as supported in the orienting, aligning and conveying mechanism of my invention.

Figure 5:
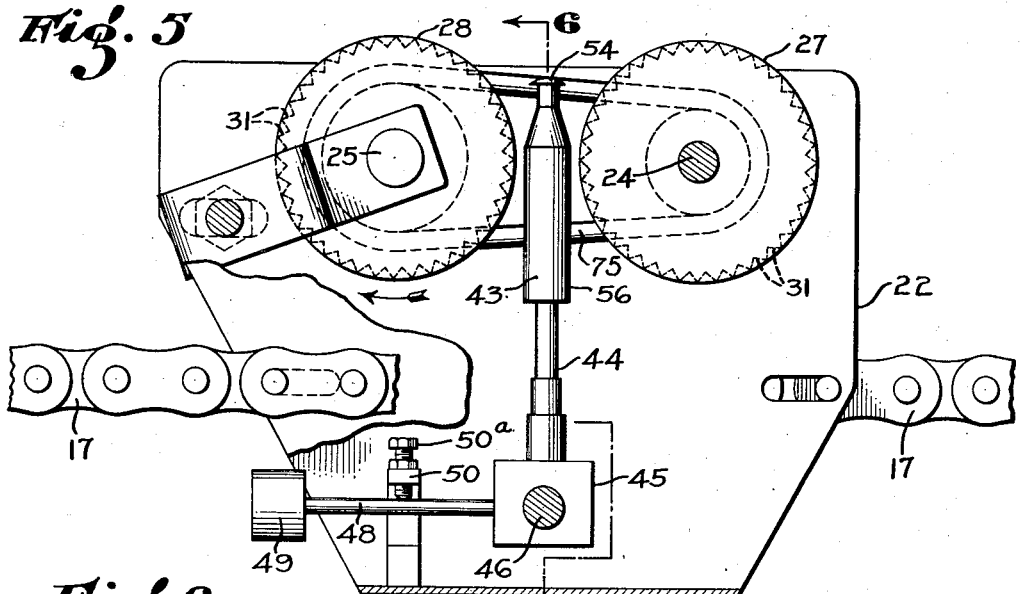
Figure 5 is an enlarged side elevation partly in vertical section, partly broken away, of the fruit orienting, aligning and conveying means of my invention.

As illustrated in general in Figure 1, this invention in its preferred form includes a feed hopper A into which fruit are indiscriminately delivered and through the medium of which the fruit are delivered one at a time to the orienting and aligning unit B from which they are taken by a transfer unit C in their oriented, aligned position and delivered to a processing device or unit D in which the fruit, in the case of clingstone peaches for example, are halved and pitted.

The hopper A may be of any suitable construction, one form of which is illustrated in Figures 1 and 2 herein. The hopper includes a barrel 1 into which the fruit is delivered and which is rotated by any suitable means so that the multiple pockets 2 thereof into which the fruit fall as the barrel is rotated, successively pass the fruit over the hopper plate 3 which has an aperture 4 therein and through which the fruit falls into the supporting, receiving, orienting and aligning elements 5 of the orienting and aligning unit B.

The supporting, orienting and aligning elements 5, after receiving the fruit from the hopper A, orient and align the fruit and transfer the same into a position where they are picked up by the clamps or cups 6 of the transfer unit C which operates to pick up fruit in its oriented and aligned position and transfer the same to a position where the fruit is impaled upon the receiving impaling blade 7 of the processing unit D in which the fruit is cut in half by any suitable means, as shown in Figure 1.

The processing unit D may be of any suitable form, one form of which is illustrated in the patent granted to Albert R. Thompson, No. 2,376,526, May 22, 1945, for Continuous Peach Pitter.

The transfer unit C may be of any suitable or desirable construction such as diagrammatically illustrated in Figure 1, including spaced cups which are mounted to rotate about the center 13 and are actuated from open to gripping position in timed relation to pick up the oriented and aligned fruit from the units B and transfer the same in timed relation to the impaling blades 7 of the halving and pitting machine D.

The orienting and aligning unit B provided for thus receiving the fruit from the hopper A and from which the fruit is transferred by the transfer unit C is of the following preferred construction:

A frame 16 supports a pair of spaced conveyer chains 17 which are trained over spaced sprockets 18 and 19 at the respective ends of the frame upon suitable supporting shafts 20 and 21. Suitable means are provided for driving the sprockets 19 including a motor 19a, driving sprocket 19b, which through chain 19c drives sprocket 19d upon shaft 21.

Carried by the spaced sprocket chains are the orienting and aligning elements 5 which may be suitably spaced lengthwise of the conveyer to operate in timed relation with the pockets 2 of the hopper A. For convenience of illustration three such elements 5 are shown in the drawing.

Figure 6:
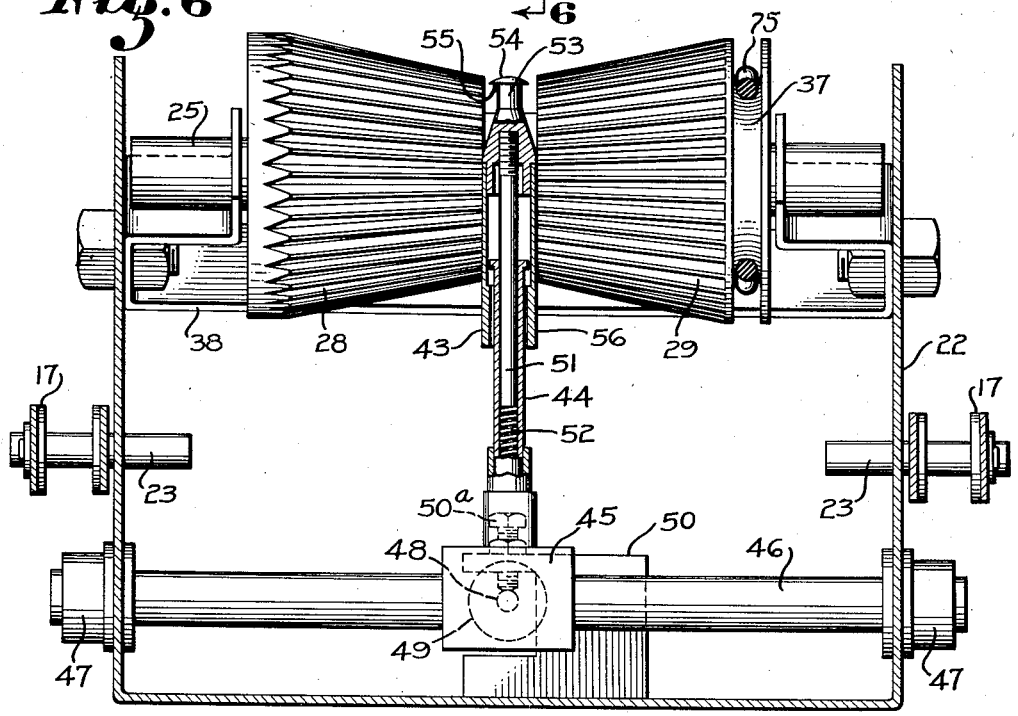
Figure 6 is an enlarged sectional view taken substantially on the line 6—6 of Figure 5 of the finder of the fruit orienting and aligning means.
Figure 10:
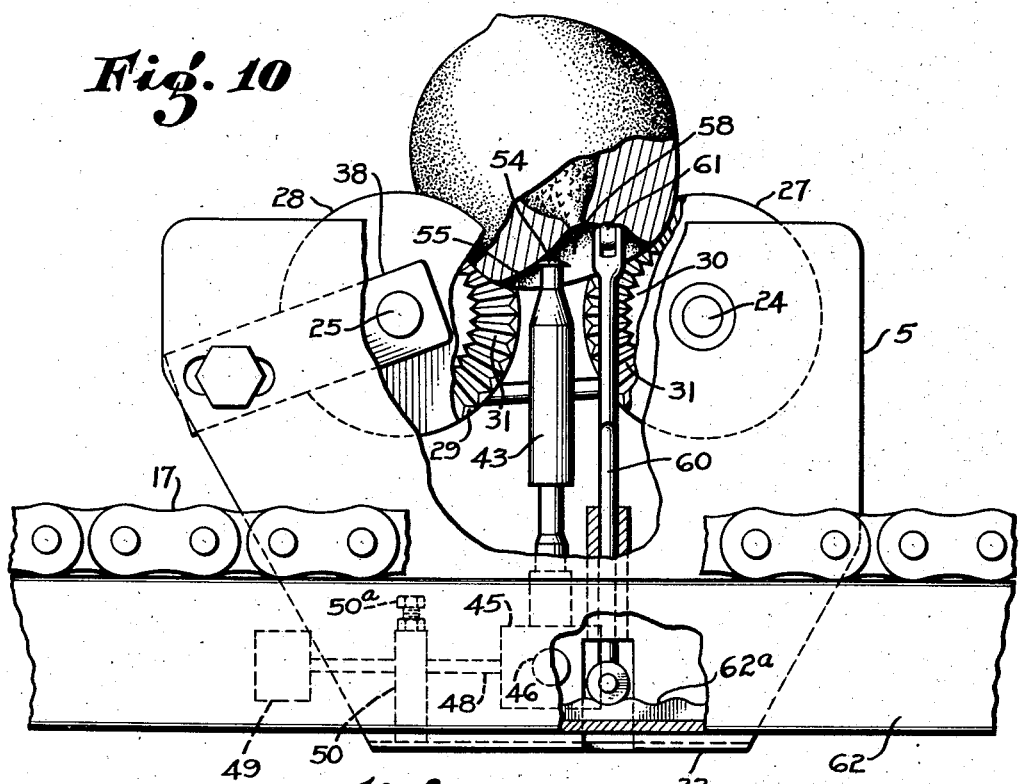
Figure 10 is a side elevation diagrammatic in character of a modification of my invention in the orienting, aligning and conveying means wherein a vibrating finder element is employed for aiding in the aligning of the fruit with reference to its plane of suture.

The units 5 include a U frame 22 as shown best in Figure 6, which is suitably secured to connecting pins 23 of the conveyor chains 17. Mounted in the frame are spaced cone supporting shafts 24 and 25. Journaled on the shaft 24 is a sleeve shaft 26. Secured to the shafts 24, 25 and 26 are drive cones 27, 28, 29 and 30 which have serrated driving surfaces ribbed to provide a predictable frictional characteristic with relation to the particular type of fruit being oriented and aligned. The sharpened ribs 31 are particularly designed with relation to the frictional characteristics desired for the orienting and aligning of clingstone peaches. Means are provided for driving the cones 27, 28, 29 and 30, which means are preferably of the following construction:

Supported by the frame 16 to one side of the elements 5 are a pair of spaced tracks 32 and 33, as shown in Figures 2 and 3. Carried by the shaft 24 and the sleeve shaft 26 which is journaled on the shaft 24 are a pair of driving rollers 34 and 35 which are adapted to roll along the engaging surfaces of the tracks 32 and 33 and thus rotate the rollers 26 and 27. A belt pulley 36 is provided at one end of the cone 30 in alignment with the corresponding belt pulley 37 formed on the corresponding cone 29. The cones 28 and 29 are secured to the shaft 25, which shaft is in turn journaled in bearing brackets 38 carried by the frame 22. A belt 75 connects the pulleys 36 and 37.

The two tracks 32 and 33 are vertically spaced apart so that the lower track 32 engages the roller 35 on its bottom surface causing the cones 28, 29 and 30 to revolve in the direction of the arrows 39. The track 33 is provided so that it may intermittently cause the cone 27 to revolve in a direction opposite to the direction of rotation of the cones 28, 29 and 30 and therefore engages the upper surface of the roller 34, causing a reverse rotation of the shaft 24. The cone 27 is secured to the shaft 24. The shafts 24 and 26 are journaled in bearings 40 and 41 respectively supported by the frame 22, as shown best in Figure 4.

The track 33 has spaced roller-engaging sections 42, as shown in Figures 1 and 3, to engage the roller 34 only at timed intervals of the travel of the supporting, orienting and aligning unit with relation to the orientation and alignment of the fruit; the reverse operation being intermittent to avoid the possibility of the fruit gyrating around a single axis so that the fruit does not become properly aligned and oriented.

Supported in the element 5 is a finder 43, shown best in Figures 5, 6, 7, 8 and 10, which finder 43 is supported between the cones 27, 28, 29 and 30 in such manner as to engage the periphery of the fruit being rotated by the cones to find the blossom indent of the fruit and then, due to its action, to arrest further rotation and cause the fruit as in the case of a clingstone peach to be aligned in the direction of the travel of the elements 5 with the plane of suture of the fruit lying in this line of travel. The finder 43 is preferably of the following construction:

A cylinder shaft 44 is secured to a supporting block 45, which block in turn is secured to a shaft 46. The shaft 46 is journaled in bearings 47 on the opposed side plates of the frame 22. Means are provided for normally supporting the finder 43 in position so that it normally is pivoted to a position toward the rearward cones 28 and 29. This means, shown best in Figures 4, 5, 7, 8 and 10, includes a bar 48 secured to the block 45 and having an adjustable weight 49 secured near its end so that the correct balance of the position of the finder 43 may be had by shifting the position of the weight 49 along the bar 48.

Secured to the frame 22 is a stop bar 50 having an adjustable stop screw 50ª and which extends over the bar 48 in position to arrest the rotation of the finder 43 in the direction of travel of the elements 5 and in substantially a vertical position of the shaft 44. Mounted to slide within the shaft 44 is a rod 51, as shown in Figure 6, which is yieldably urged outward of the shaft 44 by means of a compression spring 52. The rod 51 is journaled in the shaft 44 so that it may rotate therein.

Secured to the upper end of the rod 51 is a finder head 53 which has a cap 54 secured at its upper end providing a lip 55 which may engage in the surface of the fruit being oriented. A sleeve 56 is secured to the head 53 to prevent the admission of foreign matter into the shaft 44 and this sleeve 56 telescopes over the shaft 44. The finder 43 is thus supported both for pivotal and rotational as well as longitudinal movement.

The action of the finder in locating the blossom indent of the fruit is illustrated in Figures 7 and 8. In Figure 7 the cones are illustrated as rotating the fruit in the direction of the arrow 57. At this instant all the cones are rotating in the same direction. As the fruit is not truly spherical, it will generally roll as illustrated but will not ordinarily find a center of rotation and will therefore gyrate between the cones with the finder cap 54 in engagement with the periphery of the fruit as illustrated in Figure 7 until the fruit is so rotated that the blossom end indent 58 of the fruit passes over the finder 43. At this instant of rotation, the spring 52 operates to thrust the finder head 53 into the indent 58. The result of this operation is as illustrated in Figure 8 where the edge or lip 55 of the finder 43 engages the surface of the fruit within the indent 58, locking the fruit from further rotation as the finder is rotated on its supporting shaft 46 to a substantially vertical position. The action is to rotate the finder 43 in the direction of travel of the element 5.

During this operation the weight of the fruit may depress the finder head 53, compressing the spring 52, leaving the fruit supported by the cones 27, 28, 29 and 30. By this operation the indent of the blossom end of the fruit is found and the fruit is thus oriented in a position where the pit of the fruit has its long axis extending substantially vertically.

The cones 27, 28, 29 and 30 are still rotating and exerting their influence against the periphery of the fruit which is then, however, held from rotation by the force exerted by the finder 43. As the element 5 continues its travel, the fruit is in effect oscillated or vibrated upon the cones with the result that the elongated cavity formed at the blossom end of the fruit is aligned with the direction of travel of the fruit, bringing the plane of suture of the fruit pit in substantially true vertical alignment with the direction of travel. The finder has then found, oriented and aligned the fruit and holds the fruit in this position.

During the initial operation before the cavity is found, the finding head is relatively free to float as there is little lateral load to cause the rod 51 to bind in the shaft 44; however, when the cavity is found the lateral forces exerted tend to bind the rod and lock the fruit in its oriented and aligned position.

The cap 54 is as illustrated preferably convex to facilitate sliding on the fruit surface until the finder has located the indent of the fruit. During this operation of aligning the fruit, it is advisable at some time to reverse the direction of rotation of the cone 27 with reference to the other cones in order that the proper alignment of the fruit may be obtained and to upset any stable positioning of the fruit with reference to the finder 43 which would tend to prevent the finder 43 from properly aligning the plane of suture of the fruit pit with the direction of travel of the fruit. The finder 43, because of its free universal support, thus scans the surface of the fruit until it is free to drop into the blossom indent 58, at which time it operates after swinging to its vertical position to hold the fruit from further rotation due to the engagement of the lip 55 of the finder head 53 in the surface of the fruit in the indent.

In operating upon some fruit it may be desirable to provide an additional means for upsetting the condition of stable equilibrium of the fruit upon the finder 43 which is not overcome by the reverse rotation of one of the driving cones. In order to meet this condition I have illustrated in the modified form of this invention Figures 10 and 11. In this modification similar parts are numbered with the same numerals.

Figure 11:
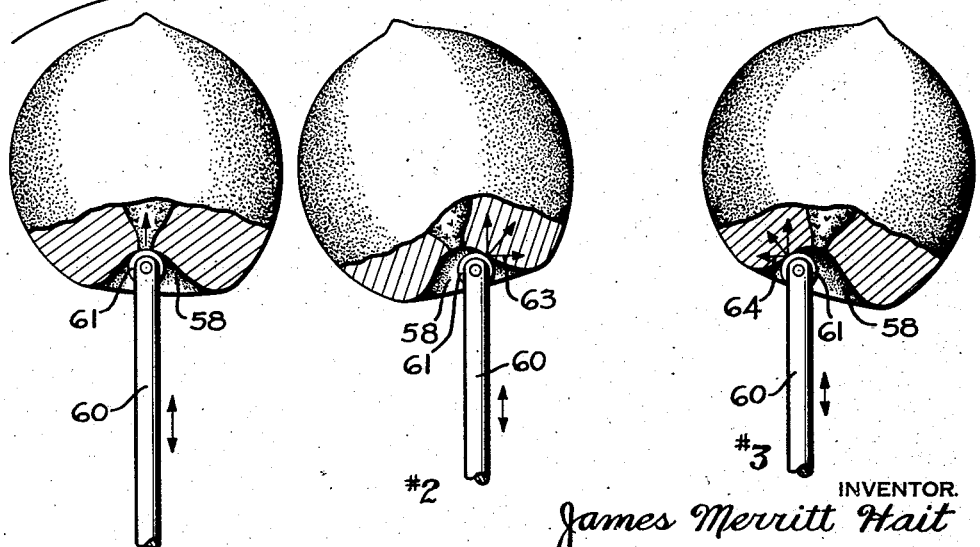
Figure 11 is a diagrammatic view showing in successive steps the operation of the vibrating finder in aligning the fruit.

In this modification I have added to the structure of the prior modification of my invention a vibrator 60 carrying at its upper end a vibrator roller 61 within the fork end of the vibrator 60. The roller 61 preferably has a convex surface and is positioned to the side of the finder 43 in the direction of travel of the elements 5. The vibrator 60 is vibrated by any suitable means such as providing an undulating cam surface 62$^a$ upon the track 62 formed at the opposite side of the frame 16 from the tracks 32 and 33. In this instance the vibrator 60 is journaled in a vertical journal in the frame of the element 5 and carries at its lower end a cam roller adapted to engage the undulating surface of the cam track. The vibrator 61 is particularly useful to effect final alignment or orientation after member 51 has effected coarse alignment by entering the indent 58. The effect of this vibrator on upsetting a condition of equilibrium of the fruit is illustrated in Figure 11 where the vertical reciprocating vibrator 60 is illustrated with its vibrating roller 61 in the indent 58 of the fruit showing that in this condition the component of force of vibration is truly vertical when the roller 61 is centrally located at the base of the elongated indent 58. In conditions 2 or 3 of Figure 11 it is illustrated that there is a component of force exerted by vibrator 60 against the surface of the fruit, which component of force is horizontal as illustrated by the line 63, tending to rotate the fruit in a direction so that the roller 61 may occupy the position as illustrated in condition 1 of this figure. Similarly, should the engaging roller 61 be located at the opposite side of the indent 58 as illustrated in condition 3, there is a similar component of force 64, tending to rotate the fruit in the direction opposite to that indicated by the force factor 63 producing final corrective alignment of the fruit with reference to its elongated indent 58.

Having fully described my invention, it is to be understood that I do not wish to be limited to the details herein set forth, but my invention is of the full scope of the appended claims.

I claim:

1. In a device of the class described, the combination of an indented fruit orienting means for orienting a fruit to position the plane of suture of the fruit, comprising a plurality of drive members upon which the fruit is positioned, means for driving the drive members to rotate the fruit, a fruit indent finder, means for pivotally supporting the finder to permit the same to move through an arc with a rocking movement in a direction transverse to the axis of the drive members, the finder having a head member and means for yieldably urging the head member into the indent of the fruit, said finder head adapted to engage the fruit within the indent to arrest rotation of the fruit by the drive members, whereby the fruit is oriented so that its plane of suture contains the arc of travel of the finder.

2. In a fruit orienting device, the combination of a plurality of driving elements upon which an indented fruit is supported, a finder positioned between the driving elements to engage the surface of the indented fruit, means for yieldably urging the finder toward the fruit, means for driving the driving elements to rotate the fruit, and means for supporting the finder to permit the same to rock through an arc whereby the finder on passing into the fruit will rock on its pivot as it engages the surface of the fruit in the indent, and a stop to arrest the rocking movement of the finder whereby the finder will arrest rotation of the fruit and will align the fruit on the supporting elements with the plane of suture of the fruit in a substantially vertical position containing the arc through which the finder is rocked.

3. In a fruit orienting device, a plurality of four rotating supporting elements upon which an indented fruit may be supported, a finder positioned between the rotating elements to engage the surface of a fruit supported thereon, means for yieldably urging the finder toward the fruit, and means for driving the supporting elements to rotate the fruit.

4. In a fruit orienting device, the combination of a plurality of fruit supporting elements on which an indented fruit is adapted to be supported, an indent finder positioned with relation to the fruit supporting elements to engage the periphery of the fruit supported thereby, means for supporting the finder for movement through a limited arc, means for yieldably urging the finder toward the fruit surface, the finder having a fruit engaging element whereby the finder in passing into the indent of the fruit will engage the fruit surface in the indent to effect orientation of fruit with reference to its plane of suture and arrest rotation of the fruit, and means for driving the fruit supporting members to rotate the fruit to bring the indent of the fruit into position to be engaged by the finder.

5. In a fruit orienting device, the combination of two pairs of spaced drive members, defining a pocket to receive an indented fruit, means for driving the members to effect random rotation of the fruit, a finder positioned between said drive members in the central portion of said pocket, means for urging the finder into position to engage the surface of the fruit supported by said drive members, and means for supporting the finder to permit the same to rock through a limited arc.

6. In a fruit orienting device, the combination of two pairs of spaced drive members defining a pocket to receive an indented fruit, means for driving the members to rotate the fruit, a finder positioned between the pairs of drive members, means for urging the finder into position to engage the surface of the fruit supported by the drive members, means for pivotally supporting the finder to permit the same to move through a limited arc, and means for imparting retrograde rotation to at least one of said drive members with respect to rotation of the other of said drive members.

7. In a device for orienting indented fruit, the combination of four spaced plurality driving elements defining a pocket to receive an indented fruit, means for driving the said elements to effect random rotation of the fruit, a finder positioned between the fruit supporting elements, means for pivotally supporting the finder, means for yieldably urging the finder toward the fruit, and means for limiting the arc of travel through which the finder rocks on its pivot.

8. In a fruit orienting device, the combination of a plurality of fruit supporting elements providing a pocket for the support of an indented fruit, means for driving the supporting elements to rotate the fruit, a finder positioned with relation to the supporting elements within the pocket to engage the surface of an indented fruit supported in the pocket, means for pivotally supporting the finder to permit the same to rock through a limited arc, and means for yieldably urging the finder toward the fruit.

9. In a fruit orienting device, the combination of a plurality of fruit supporting elements providing a pocket for the support of an indented fruit, means for driving the supporting elements to rotate the fruit, a finder positioned with relation to the supporting elements within the pocket to engage the surface of an indented fruit supported in the pocket, means for supporting the finder to permit suture orientation of the fruit in the plane of travel of the driving elements, means for yieldably urging the finder toward the fruit, and the finder having an end to engage the walls of the fruit indent thereby to arrest rotation of the fruit.

10. In a device of the class described, the combination of a plurality of drive members upon which a fruit is supported, means for driving the drive members to rotate the fruit, a fruit indent finder adapted to engage the indent of a fruit, and means for imparting retrograde rotation to one of the fruit supporting members with respect to the rotation of the others of said drive members to change the fruit rotation to enable the finder to locate the fruit indent.

11. In a fruit orienting device, the combination of a plurality of frusto-conical fruit supporting members having a modified surface whereby frictional contact between a fruit supported upon said frusto-conical members is increased, means for driving the frusto-conical members to rotate the fruit supported thereon, an indent finder positioned with relation to the frusto-conical members to engage within the indent of a fruit supported thereby, and means for imparting retrograde rotation to one of the fruit supporting members with respect to the rotation of the others of said first supporting members whereby the finder will find the indent of the fruit and orient its suture with relation to the plane of travel of the fruit.

12. In a fruit orienting means for orienting indented fruit having an elongated indent, the elongation of which lies in the plane of suture of the fruit, the combination of a plurality of fruit driving and supporting elements upon which the indented fruit is supported with its indent downward, a finder positioned between the driving elements to engage the surface of the indented fruit, means for driving the supporting elements to rotate the fruit so that the finder will pass into the fruit indent and hold the fruit from further rotation by the supporting elements, means imparting retrograde rotation to one of the supporting elements with respect to the rotation of the other of said supporting elements whereby the fruit will be rocked as supported by the elements and the fruit cavity found by the finder passing to the end of the elongated fruit indent, thereafter aligning the plane of suture of the fruit.

13. In a fruit orienting device, the combination of four frusto-conical fruit driving and supporting elements upon and between which an indented fruit finder is supported, an indent finder located between the drive elements in position to pass into the fruit indent when the fruit is rotated by the supporting elements, means to rotate the supporting elements, and means to impart retrograde rotation to one of the supporting elements with respect to the rotation of the other of said supporting elements to rock the fruit on the supports before the finder is located in the fruit indent which thereafter orients the plane of suture of the fruit in the direction of motion of the drive elements.

14. In combination, a conveyor moving continuously at a uniform rate, a plurality of peach holding members, each of said members being adapted to hold a whole peach therebetween, peach sawing mechanism mounted to engage a peach in each of said peach holding units to divide each peach and its pit as said peach holding members move at said uniform rate, peach pitting mechanism mounted for engagement with the peach halves in said members to pit said halves, peach orienting mechanism including a second conveyor moving continuously at said uniform rate, a plurality of whole peach holders carried by said second conveyor, means mounted for movement with said second conveyor at said uniform rate for orienting whole peaches in said members while the second conveyor is moving at said uniform rate, means for feeding whole peaches in succession to said holding members while said members are moving with said second conveyor at said uniform rate, a transfer conveyor moving continuously at a uniform rate, means carried by said transfer conveyor for abducting each oriented peach from the holding member of the second conveyor and delivering the abducted whole peach to the peach holding members of the first mentioned conveyor with the suture plane of the oriented peach aligned with the plane of the peach sawing means, means for operating the sawing means and pitting mechanism to saw the oriented whole peach along the suture plane and thereafter pit each half peach.

15. In combination, a first fruit moving conveyor adapted to be driven at a continuous uniform rate, a plurality of peach holding members on said conveyor, peach orienting mechanism operatively associated with each peach holding member, a second fruit moving conveyor having two-part peach holding members thereon, peach sawing mechanism operatively associated with said second conveyor to divide each peach and its pit into halves while held by said two-part holding members, peach pitting mechanism adjacent said second conveyor operatively associated with said two-part holding members to pit said halves, a transfer conveyor adapted to be driven at a continuous uniform rate adjacent said first fruit moving conveyor, abducting and delivering means on said transfer conveyor having operative association with said first mentioned peach holding members and said two-part peach holding members for abducting each oriented peach from the holding member of said first fruit moving conveyor and delivering the abducted whole peach to the two-part peach holding member of said second fruit moving conveyor with the suture plane of the oriented peach aligned with the plane of the peach sawing mechanism.

References Cited in the file of this patent

UNITED STATES PATENTS

| | | |
|---|---|---|
| 2,232,209 | Carroll | Feb. 18, 1941 |
| 2,265,515 | Carroll | Dec. 9, 1941 |
| 2,288,062 | Ashlock | June 30, 1942 |
| 2,308,039 | Ashlock | Jan. 12, 1943 |
| 2,376,526 | Thompson | May 22, 1945 |
| 2,387,709 | Ashlock | Oct. 30, 1945 |
| 2,406,311 | Ashlock | Aug. 27, 1946 |
| 2,526,712 | Thompson | Oct. 24, 1950 |